(12) United States Patent
Abe et al.

(10) Patent No.: US 10,425,577 B2
(45) Date of Patent: Sep. 24, 2019

(54) IMAGE PROCESSING APPARATUS AND IMAGING APPARATUS

(71) Applicant: Panasonic Intellectual Property Management Co., Ltd., Osaka (JP)

(72) Inventors: Mitsuo Abe, Osaka (JP); Mitsuyoshi Okamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 15 days.

(21) Appl. No.: 15/604,760

(22) Filed: May 25, 2017

(65) Prior Publication Data
US 2018/0041697 A1    Feb. 8, 2018

(30) Foreign Application Priority Data

| Aug. 2, 2016 | (JP) | ................................. 2016-152176 |
| Sep. 13, 2016 | (JP) | ................................. 2016-178474 |
| Apr. 3, 2017 | (JP) | ................................. 2017-073478 |

(51) Int. Cl.
*H04N 5/232*      (2006.01)
*H04N 5/235*      (2006.01)

(52) U.S. Cl.
CPC ....... *H04N 5/23222* (2013.01); *H04N 5/2356* (2013.01); *H04N 5/23212* (2013.01); *H04N 5/23245* (2013.01); *H04N 5/235* (2013.01); *H04N 5/23216* (2013.01)

(58) Field of Classification Search
CPC ....................... H04N 5/23212; H04N 5/23216
USPC .................................. 396/103, 104, 121, 123
See application file for complete search history.

(56) References Cited

U.S. PATENT DOCUMENTS

| 9,449,234 | B2* | 9/2016 | Kelley | ............... G06K 9/00791 |
| 2003/0174233 | A1* | 9/2003 | Onozawa | ........... H04N 5/23212 |
| | | | | 348/349 |
| 2006/0029381 | A1* | 2/2006 | Onozawa | ............... G03B 13/16 |
| | | | | 396/147 |
| 2014/0210999 | A1* | 7/2014 | Komatsu | ............ H04N 5/23212 |
| | | | | 348/135 |
| 2015/0229830 | A1* | 8/2015 | Mizukami | .......... H04N 5/23212 |
| | | | | 348/346 |

(Continued)

FOREIGN PATENT DOCUMENTS

JP      2014-207502      10/2014

*Primary Examiner* — Clayton E. LaBalle
*Assistant Examiner* — Linda B Smith
(74) *Attorney, Agent, or Firm* — Retter, Otto, Boisselle & Sklar, LLP

(57) ABSTRACT

An image processing apparatus includes an image processor, a display unit, an operation unit, and a controller. The image processor combines data of a plurality of images to generate data of a still image deeper in depth of field, the plurality of the images that are generated by shooting an object image while changing a focus position. The display unit displays a range designation screen displaying an image together with a plurality of image areas. The operation unit receives a designation, performed by the user, of an image area in the range designation screen. When a first and a second image area in the range designation screen are designated by the user, the controller sets a combining range having a focus position located between the first and the second image area. The display unit performs a first display-highlighting on the image areas included in the combining range set.

9 Claims, 17 Drawing Sheets

(56) References Cited

U.S. PATENT DOCUMENTS

2015/0279012 A1* 10/2015 Brown .................... G06T 5/003
382/284
2016/0028948 A1    1/2016 Omori et al.
2017/0244883 A1*  8/2017 Abe ..................... H04N 5/2356
2017/0272658 A1*  9/2017 Ito ...................... H04N 5/23287

* cited by examiner

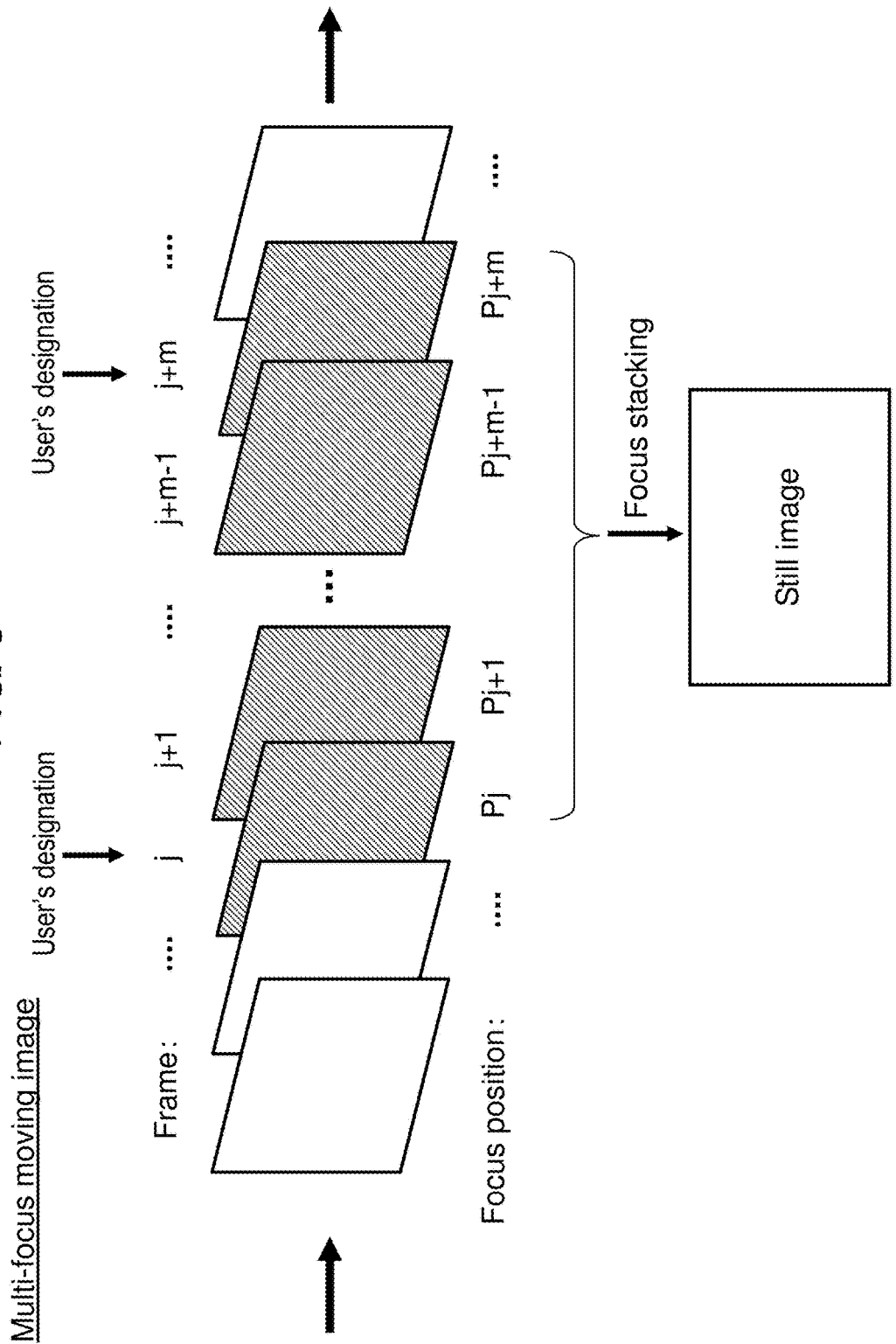

FIG. 7(A)

| | Focus lens position (Pnear) closest to the nearest end | Focus lens position (Pfar) closest to the infinity end |
|---|---|---|
| a | 10 | 200 |

FIG. 7(B)

| | | | | | | | | |
|---|---|---|---|---|---|---|---|---|
| Number of AF area | 1 | 2 | 3 | ... | 19 | ... | 49 | |
| b | Frame number | 5 | 43 | 36 | ... | 50 | ... | 100 |
| c | Focus lens position (In focus position) | 10 | 100 | 75 | ... | P | ... | 200 |

60 — Focus information table

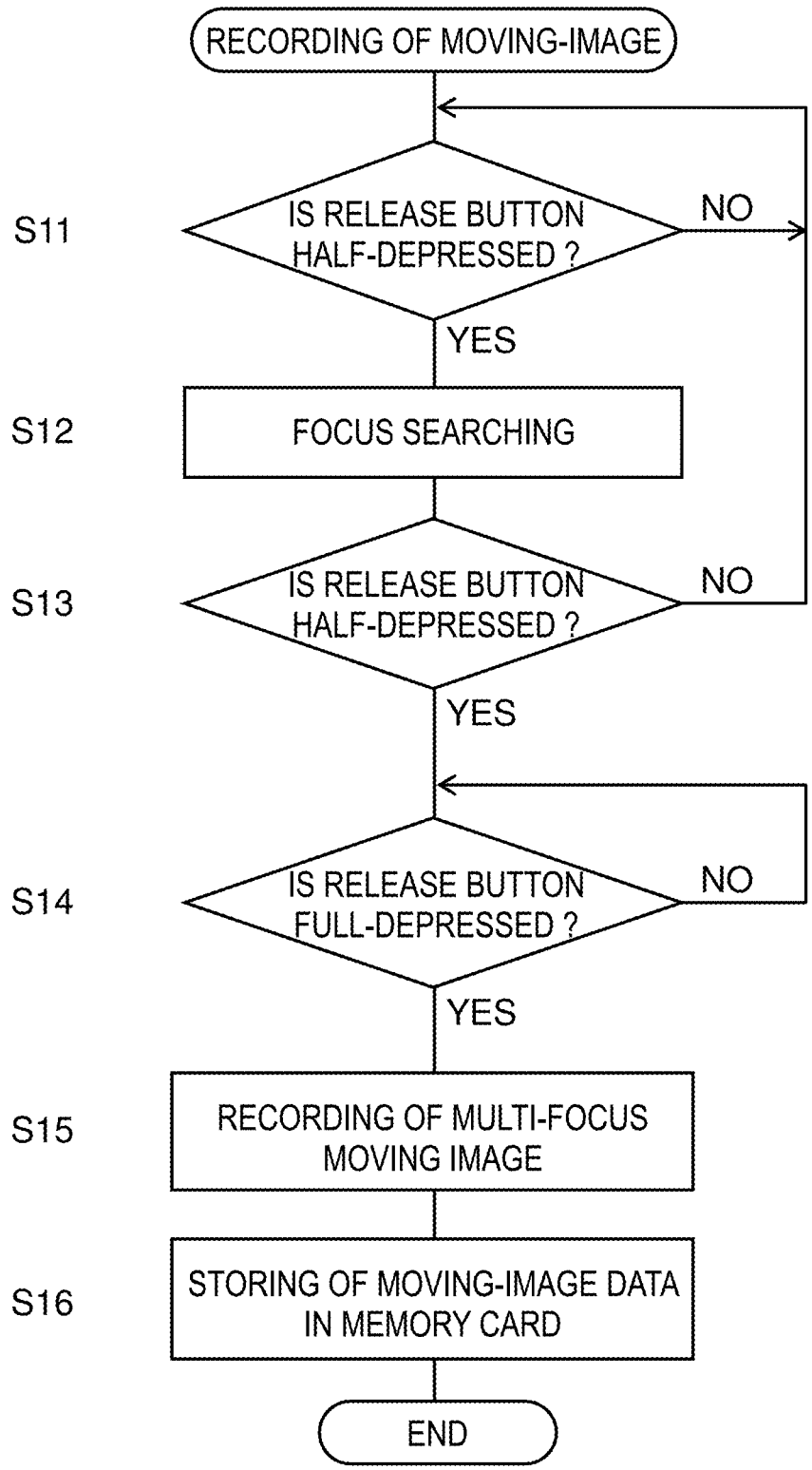

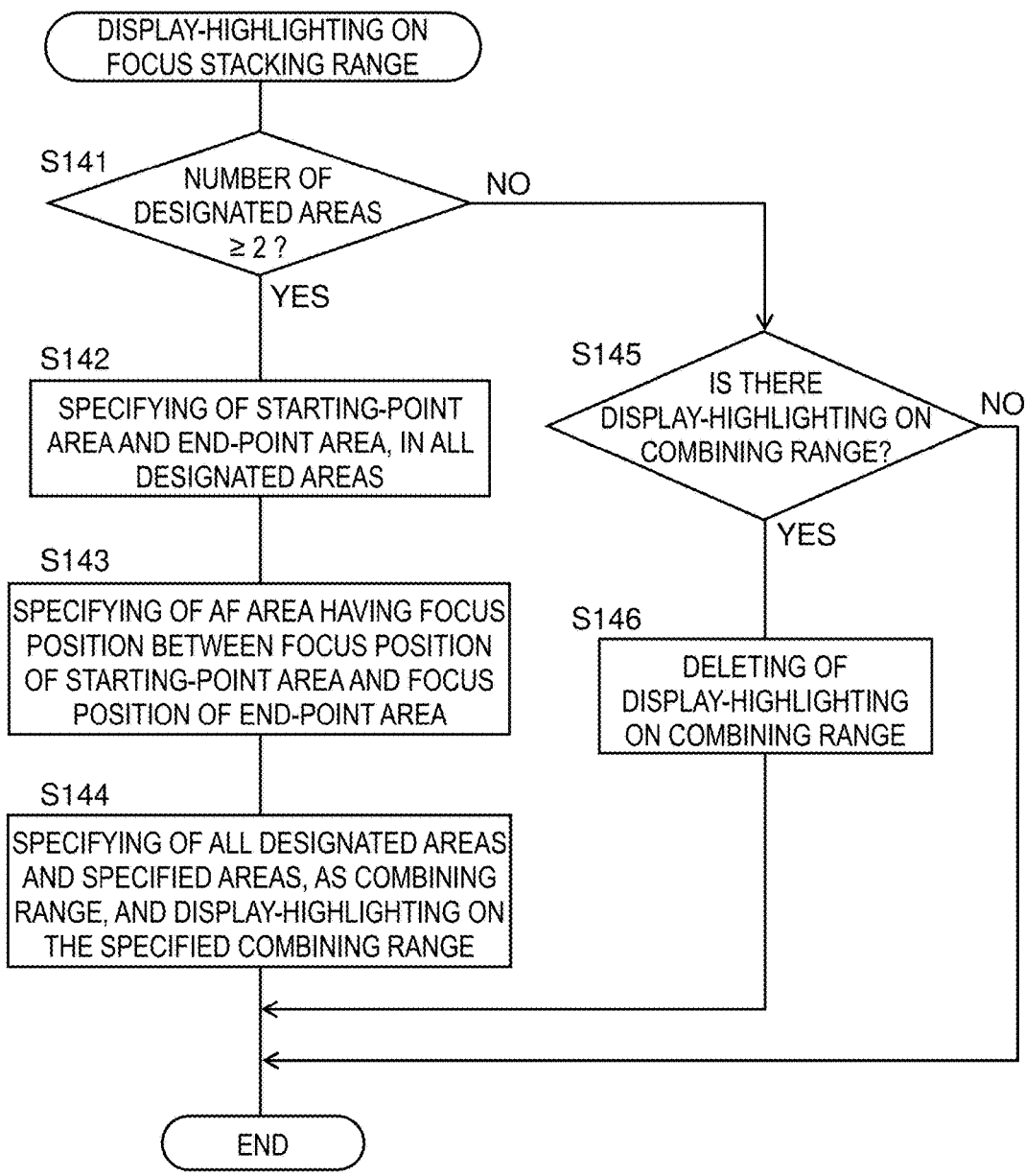

IMAGE PROCESSING APPARATUS AND IMAGING APPARATUS

BACKGROUND

1. Technical Field

The present disclosure relates to image processing apparatuses and imaging apparatuses, with each of the apparatuses having a function of combining a plurality of images to produce an image with a deep depth of field.

2. Description of the Related Art

Patent Literature 1 discloses an imaging apparatus for capturing a plurality of images with different focuses, and for producing an image with a deep depth of field by using the plurality of the captured images, with the thus-produced image is deeper in depth of field than the captured images. With the imaging apparatus disclosed in Patent Literature 1, an operator selects a plurality of objects on which the operator wants to focus. Then, the objects' images are captured on the basis of positions of focus of the subjects having been selected by the operator. With this configuration, a combined image can be obtained which is focused at the focus positions as intended by the operator.

CITATION LIST

Patent Literature

PTL 1: Japanese Patent Unexamined Publication No. 2014-207502

SUMMARY

When a plurality of images is combined to generate an image which is deeper in depth of field than the images, a user has to specify an object's range (combining range) that the user wants to bring into focus.

The present disclosure is intended to provide an image processing apparatus and an imaging apparatus. Such apparatuses have advantages of enhanced user's convenience in designating a combining range, in cases where a plurality of images is combined to generate an image which is deeper in depth of field than the images.

In accordance with one aspect of the present disclosure, an image processing apparatus and an imaging apparatus are presented. Each of the image processing apparatus and the imaging apparatus includes: an image processor, a display unit, an operation unit, and a controller. The image processor combines data of a plurality of images to generate data of a still image deeper in depth of field, the plurality of the images that are generated by shooting an object image while changing a focus position. The display unit displays a range designation screen for use in designating a desired in-focus range by a user. The range designation screen displays, together with a plurality of image areas, an image represented by the data of the images. The operation unit receives a designation, performed by the user, of an image area in the range designation screen. The controller controls the image processor and the display unit. When a first and a second image area in the range designation screen are designated by the user, the controller sets the first and the second image area as a starting-point area and an end-point area, respectively. Then, the controller specifies another image area having a focus position located between a focus position of an object in the starting-point area and a focus position of an object in the end-point area. Moreover, the controller sets a combining range including the starting-point area, the end-point area, and the specified another image area. The display unit performs a first display-highlighting on the image areas included in the combining range set in the range designation screen.

In accordance with the image processing apparatus and the imaging apparatus according to the present disclosure, when two image areas are designated by the user, image areas to be combined via focus stacking, i.e. an object's range to be brought into focus, are subjected to the display-highlighting. This allows the user to easily recognize the object's range to be brought into focus. Moreover, the user can designate an in-focus range only by designating a starting and an end point of the object's range which the user wants to bring into focus. Therefore, this can enhance user's convenience in cases where the user sets the object's range which the user wants to bring into focus.

BRIEF DESCRIPTION OF THE DRAWINGS

FIG. 5 is a view illustrating a concept of focus stacking by using frame images of the multi-focus moving image;

FIG. 7(A) is a view illustrating an example of a focus information table;

FIG. 7(B) is a view illustrating an example of a focus information table;

FIG. 8 is a flowchart illustrating recording processing of a focus-selecting moving image;

FIG. 16 is a flowchart illustrating display-highlighting processing on the focus stacking range.

DETAILED DESCRIPTION OF THE PREFERRED EMBODIMENT

Hereinafter, detailed descriptions of embodiments will be made with reference to the accompanying drawings as deemed appropriate. However, descriptions in more detail than necessary will sometimes be omitted. For example, detailed descriptions of well-known items and duplicate descriptions of substantially the same configuration will sometimes be omitted, for the sake of brevity and easy understanding by those skilled in the art. Note that the accompanying drawings and the following descriptions are presented to facilitate fully understanding of the present disclosure by those skilled in the art and, therefore, are not intended to impose any limitations on the subject matter described in the appended claims.

Now, exemplary embodiments of an imaging apparatus according to the present disclosure are described with reference to the drawings.

First Exemplary Embodiment

1. Configuration

Figure 1:
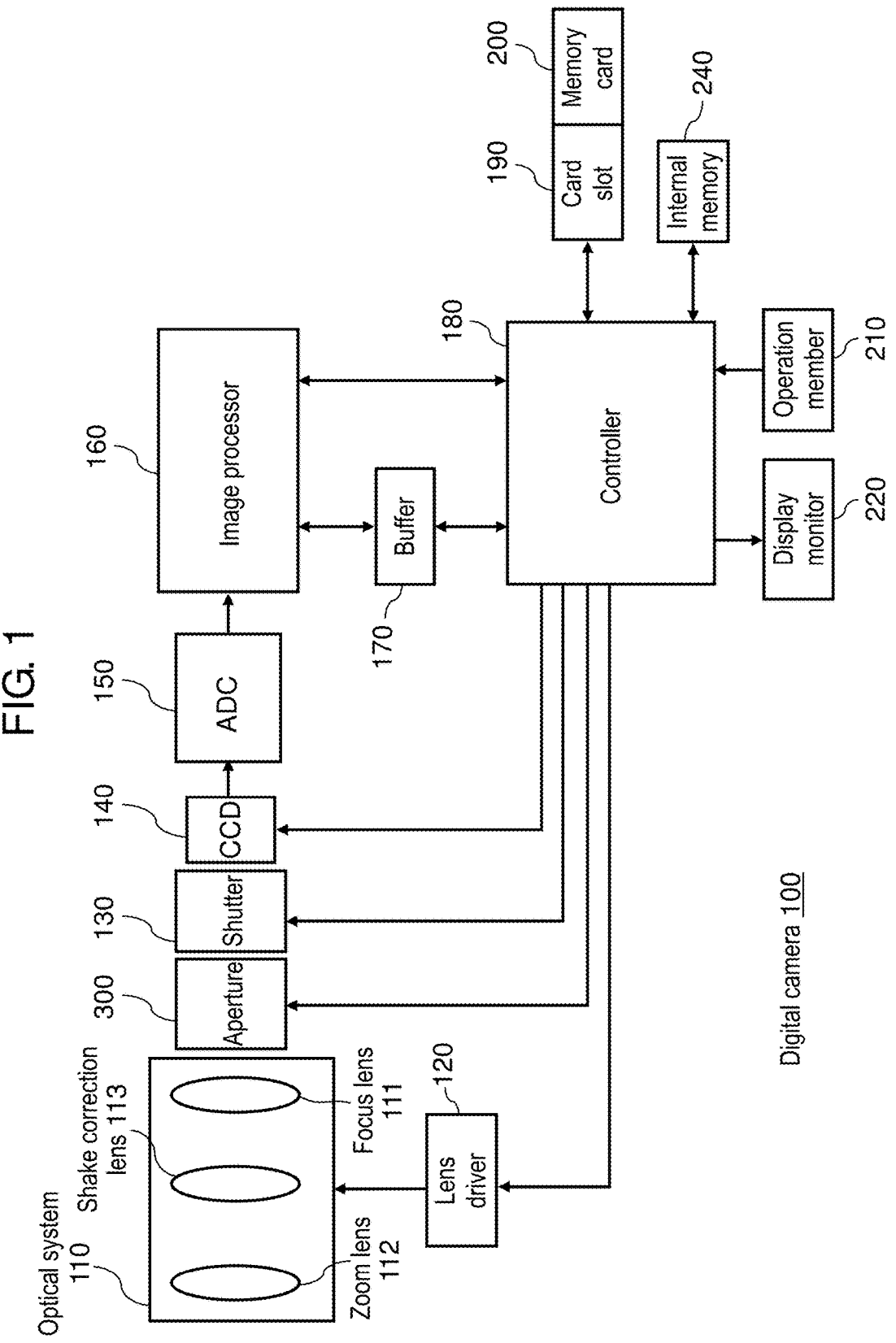
FIG. 1 is a view illustrating a configuration of a digital camera according to an embodiment.

An electrical configuration of a digital camera (an example of the imaging apparatus) according to a first embodiment will be described with reference to FIG. 1. FIG. 1 is a block diagram illustrating a configuration of digital camera 100. Digital camera 100 is an imaging apparatus that produces an object image with optical system 110 configured with one or more lenses, and that captures the object image with charge-coupled device (CCD) 140. Image data produced by CCD 140 are subjected to various kinds of processing by image processor 160 and then stored in memory card 200. Hereinafter, the configuration of digital camera 100 will be described in detail.

Optical system 110 includes focus lens 111 and zoom lens 112. The object image can be enlarged or reduced by moving zoom lens 112 along the optical axis. Moreover, a focus (focus state) of the object image can be adjusted by moving focus lens 111 along the optical axis. In addition, optical system 110 includes shake correction lens 113 for correcting an image blur which is caused by a shake of digital camera 100.

Lens driver 120 drives various kinds of lenses included in optical system 110. Lens driver 120 includes a zoom motor for driving zoom lens 112 and a focus motor for driving focus lens 111, for example.

Aperture 300 adjusts the degree of opening of its opening so as to adjust an amount of light passing through it, either automatically or in accordance with user's determination.

Shutter 130 is a means to obstruct light from passing through to reach CCD 140. Shutter 130, together with optical system 110 and aperture 300, controls optical information that represents the object image. Moreover, optical system 110 and aperture 300 are accommodated in the inside of a lens barrel (not shown).

CCD 140 captures an object image produced by optical system 110 to produce image data. CCD 140 includes a color filter, a light-receiving element, and an auto gain controller (AGC). The light-receiving element converts an optical signal, which is condensed by optical system 110, into an electrical signal, thereby producing image information. The AGC amplifies the electrical signal that has been output from the light-receiving element. CCD 140 is an example of an imaging unit.

An analog-digital converter (ADC: A/D converter) 150 converts the analog image data produced by CCD 140 into digital image data.

Image processor 160, being controlled by controller 180, subjects the digital image data to various kinds of processing, with the data having been produced by CCD 140 and then converted. Image processor 160 produces image data which include: data for displaying images on display monitor 220, and image data for storing images in memory card 200. For example, image processor 160 subjects the image data produced by CCD 140 to the various kinds of processing, such as, a gamma correction, white balance correction, and flaw correction. Moreover, image processor 160 compresses the image data produced by CCD 140 in a compression format or the like in conformity with the H.264 standard or the MPEG2 standard. Furthermore, image processor 160 can produce moving-image data (4k-resolution moving-image data) with the number of pixels of 4000×2000 or so, for example, in accordance with image data produced by CCD 140. Image processor 160 is capable of subjecting the thus-produced 4k-resolution moving-image data to various kinds of processing that are to be described later. For example, image processor 160 performs focus stacking (focus synthesizing) processing by using frame images that configure the thus-produced 4k-resolution moving-image data; its detailed description will be made later.

Controller 180 is a means to control the whole of digital camera 100. Controller 180 can be implemented by using semiconductor elements and the like. Controller 180 is an example of a controller.

Each of image processor 160 and controller 180 may be configured only with hardware or, alternatively, configured with a combination of hardware and software. Controller 180 can be implemented by using, such as, a microcomputer, central processing unit (CPU), micro-processing unit (MPU), digital signal processor (DSP), application-specific integrated circuit (ASIC), or field-programmable gate array (FPGA).

Buffer 170 functions as a work memory for image processor 160 and controller 180. Buffer 170 can be implemented by using, for example, a dynamic random access memory (DRAM), a ferroelectric memory, or the like.

Card slot 190 is a means to mount memory card 200 in digital camera 100. Card slot 190 is capable of coupling memory card 200 to digital camera 100, mechanically and electrically.

Memory card 200 includes a flash memory, a ferroelectric memory, or the like in the inside of the card, and is capable of storing data, such as, image files produced by image processor 160.

Internal memory 240 is configured with an internal memory, a ferroelectric memory, or the like. Internal memory 240 stores data, control programs to control the whole of digital camera 100, and the like.

Operation member 210 is a generic term that refers to user interfaces which receive user's operations. Operation member 210 includes: a button, lever, dial, touch panel, and switch; they receive operations by a user. Moreover, operation member 210 includes a focus ring which is disposed at the outer periphery of the lens barrel. The focus ring is a member that is rotationally operated by the user to move focus lens 111.

Display monitor 220 is capable of displaying images including: an image (through image) expressed by the image data produced by CCD 140, and an image expressed by image data that are read from memory card 200. In addition, display monitor 220 is capable of displaying various menu screens which are used to perform various settings of digital camera 100. Display monitor 220 is configured with, such as, a liquid crystal display device or an organic electroluminescent (EL) display device. Display monitor 220 is an example of a display unit.

Figure 2:
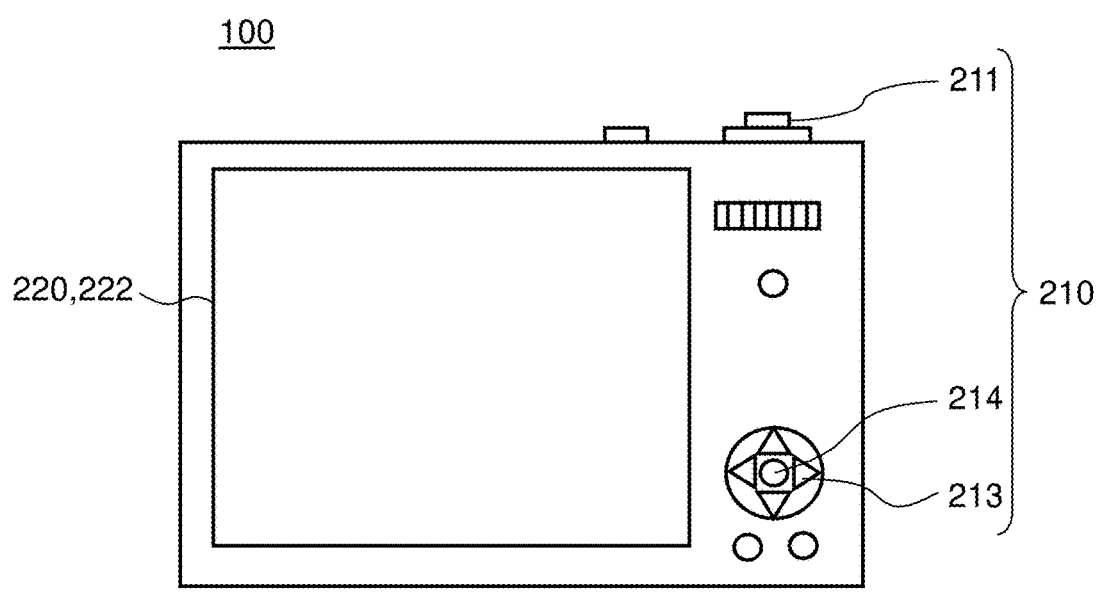
FIG. 2 is a rear-elevation view of the digital camera.

FIG. 2 is a rear-elevation view of digital camera 100. In FIG. 2, there are shown release button 211, selection buttons 213, decision button 214, and touch panel 222, which are examples of operation members 210. Upon receiving a user's operation, a corresponding one of operation members 210 transmits various instruction signals to controller 180.

Release button 211 is a two-step pushbutton. When release button 211 is subjected to half-depressing operation by the user, controller 180 performs auto focus control (AF control), auto exposure control (AE control), and the like. Then, when release button 211 is subjected to full-depressing operation by the user, controller 180 stores image data that are captured at the timing of the depressing operation, as a recorded image, into memory card 200 or the like.

Selection buttons 213 are up/down/left/right pushbuttons. By depressing any of up/down/left/right selection buttons 213, the user can perform a corresponding one of operations including; moving a cursor, a frame to be described later, and the like; and selecting various items of conditions that are currently being displayed on display monitor 220.

Decision button 214 is a pushbutton. In cases where digital camera 100 is in a shooting or playback mode, when decision button 214 is depressed by the user, controller 180 displays a menu screen on display monitor 220. The thus-displayed menu screen is a screen image that is used to set various conditions for shooting and playing back. When decision button 214 is depressed, in a state where a setting item has been selected from the setting items for various conditions, controller 180 decides to set the selected setting item.

Touch panel 222 is disposed to be superposed on the display screen of display monitor 220. The touch panel detects touch operations which are performed on the display screen by a user's finger. With this configuration, the user can perform operations, such as, designation of a display area of an image which is currently being displayed on display monitor 220. Touch panel 222 is an example of an operation unit.

2. Operation

Descriptions will be made regarding operations of digital camera 100 configured as described above. Digital camera 100 has a function of focus stacking (focus synthesizing), which is as follows: The camera combines a plurality of different images which have been shot with different focus positions (focus lens positions), thereby generating a still image with a pseudo-deep depth of field. Digital camera 100 is an example of an image processing apparatus in that it has the function of focus stacking. Hereinafter, operations of digital camera 100 will be described concerning to the function of focus stacking.

2-1. Focus Stacking

Figure 3:
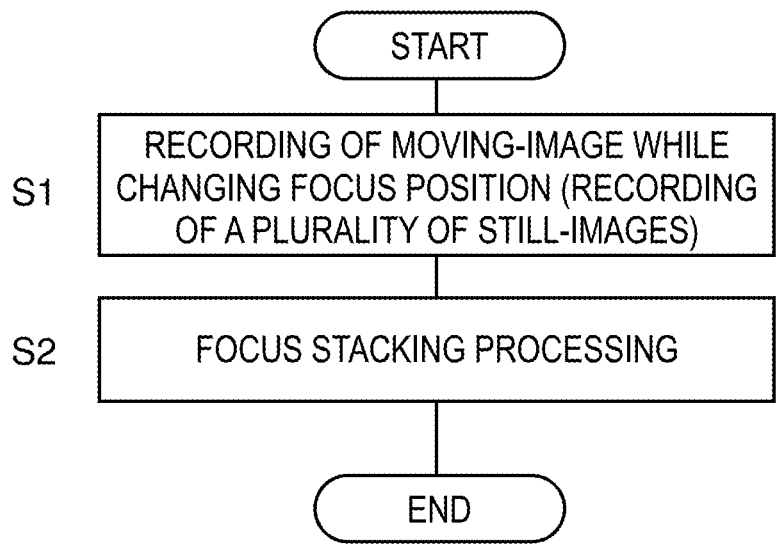
FIG. 3 is a flowchart illustrating a flow of focus stacking processing.

FIG. 3 is a flowchart illustrating a process in which digital camera 100 performs the function of focus stacking. To obtain a plurality of still images to be used for the focus stacking, digital camera 100 performs processing of recording a moving image while changing its focus position (position of focus) (S1). After that, digital camera 100 performs focus stacking processing (S2) by using frame images (still images) that are contained in the thus-recorded moving image, thereby generating a still image with a deep depth of field. Note that the focus stacking processing (S2) may be performed continuously after the moving-image recording processing (S1) or, alternatively, may be performed at any timing after the moving-image recording processing (S1) has been completed.

2-1-1. Recording of Moving Image for Use in Focus Stacking

Descriptions will be made regarding the processing (S1) of recording a moving image to be used for focus stacking, with reference to FIGS. 4 to 7. In the processing, to obtain a plurality of different still images (frame images) with different focus positions, the moving image is recorded while its focus position is being changed continuously. Hereinafter, the moving image recorded in this way is referred to as the "multi-focus moving image." Digital camera 100 is provided with a specific shooting mode in which such a multi-focus moving image is recorded. The user can place digital camera 100 into the specific shooting mode, by operating a menu or an operation dial, for example.

The multi-focus moving image is a moving image which is recorded while its focus position is being changed continuously. As a multi-focus moving image, for example, a high-definition 4k-resolution moving image with the number of pixels of 4000×2000 or so is recorded. The focus stacking processing is performed using a plurality of frame images which are selected, on the basis of user's designation, from among the frame images that configure the 4k-resolution moving image. The image generated in this way has high image quality because it is produced via the focus stacking on the basis of the 4k-resolution moving image.

Figure 4:
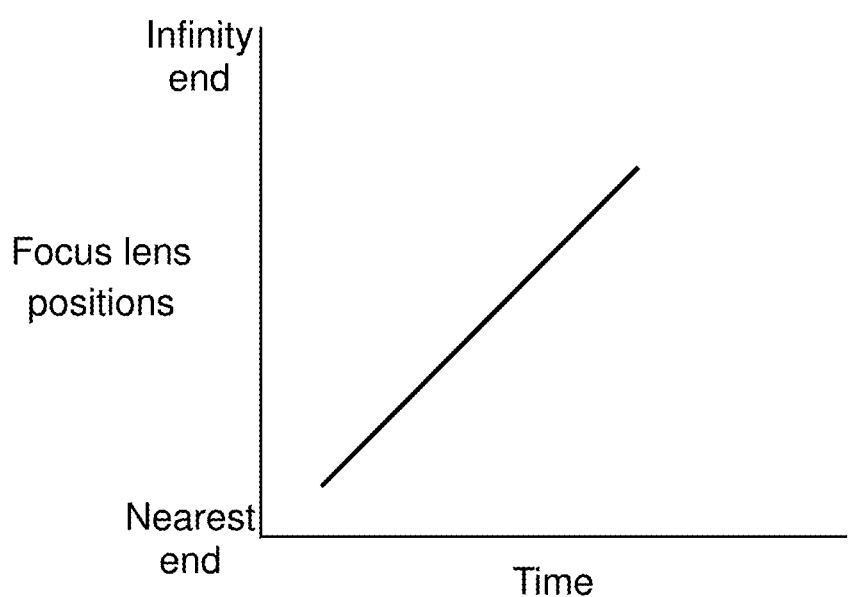
FIG. 4 is a graph illustrating a travel of a focus lens when a multi-focus moving image is recorded.

In recoding a multi-focus moving image, the moving image is shot while its focus position is being changed, that is, focus lens 111 is travelling from a nearest end side toward an infinity end side (or vice versa), as shown in FIG. 4. The multi-focus moving image, which is recorded in this way, contains a plurality of different frame images Pn that are recorded at different focus positions. In the focus stacking processing, an image is generated by combining frame images (images indicated by hatching in FIG. 5) which are selected from among the plurality of the different frame images Pn that have been shot in this way. The thus-selected frame images correspond to an object's range that is designated by the user. Details of this will be described later.

Figures 6A, 6B:
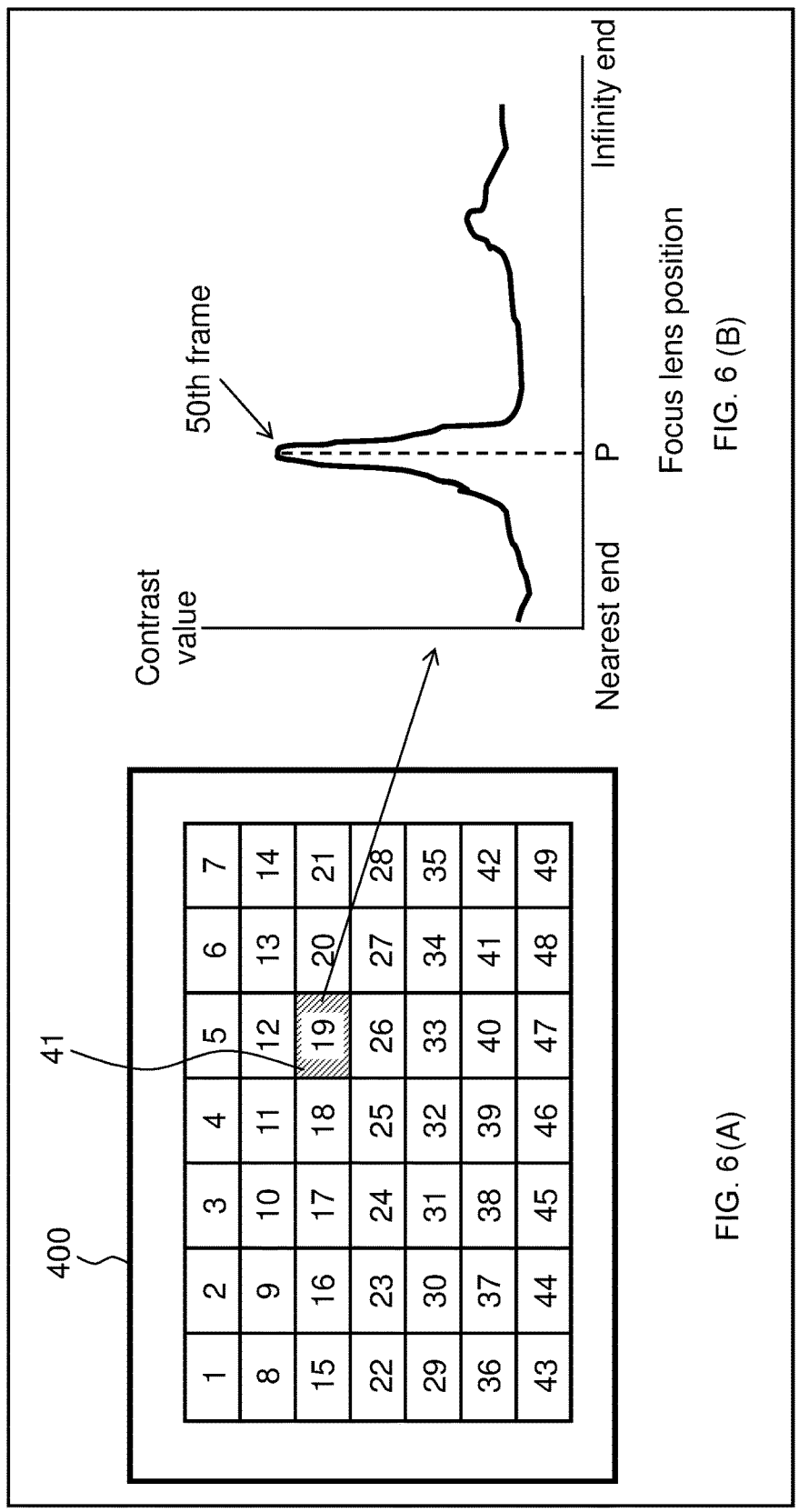
FIG. 6(A) is a view illustrating a plurality of auto focus (AF) areas which is set in an image area.
FIG. 6(B) is a graph illustrating variations in contrast value in an AF area, with the variations accompanying the travel of the focus lens.

In the auto focus operation of digital camera 100 according to the embodiment, a plurality of auto focus (AF) areas is set in image area 400, as shown in (A) of FIG. 6. In the embodiment, 49 AF areas (7 rows by 7 columns) are set. For every AF area, a frame in which an object in the AF area is in focus is determined (the frame is referred to as the "in-focus frame," hereinafter). Information on the thus-determined in-focus frame is recorded in a focus information table. Before digital camera 100 records (shoots) a multi-focus moving image, the camera performs a focus searching operation to search every AF area to find the in-focus frame of the area, thereby producing the focus information table.

FIG. 7 is a view illustrating a data structure of the focus information table. As shown in (A) of FIG. 7, focus information table 60 includes information that indicates a driving range of focus lens 111; the driving range is a range of lens' travel during the focus searching operation and the moving-image recording operation. Specifically, focus information table 60 stores the following information, as the information indicating the driving range of focus lens 111. Such information includes: information (the nearest focus-lens position) that indicates the focus lens position (Pnear) closest to the nearest end, and information (the farthest focus-lens position) that indicates the focus lens position (Pfar) farthest from the nearest end toward the infinity end. Moreover, as shown in (B) of FIG. 7, focus information table 60 manages every AF area, with the focus lens position for the AF area (the position of focus lens 111 that brings the AF area into focus: focus position) being associated with the frame number of the in-focus frame of the AF area.

For example, a contrast value is determined for every AF area while focus lens 111 is travelling. At that time, regarding 19th AF area 41 shown in (A) of FIG. 6, when a peak in contrast is detected at focus lens position "P," as shown in (B) of FIG. 6, it is recognized that the frame shot at focus lens position "P" (i.e. the 50th frame in this case) is the in-focus frame associated with 19th AF area 41. Then, in focus information table 60, there are recorded both numeral "50" as the frame number of the in-focus frame and symbol "P" as the position of focus lens 111, both in a one-to-one association with the 19th AF area. Focus information table 60 is stored in a header part of moving image data obtained by shooting a moving image, for example.

Detailed descriptions will be made regarding the processing (S1) of recording a moving image for use in the focus stacking, with reference to a flowchart shown in FIG. 8.

In digital camera 100, let us consider a state in which the camera has been placed in the specific shooting mode for recording a multi-focus moving image, and yet in which a desired angle of view has been set by operating zoom lens 112 and the like. Upon half-depressing of release button 211 by a user (YES, in S11), controller 180 performs a focus searching operation to detect a focus position of an image for every AF area, with the focus position being used in producing focus information table 60 (S12).

In the focus searching, controller 180 detects the contrast for every AF area while causing focus lens 111 to be travelling from the nearest end to the infinity end (or vice versa), see FIG. 6.

Then, controller 180 produces focus information table 60 on the basis of the thus-detected contrast values. Specifically, controller 180 determines the position of focus lens 111, for every AF area, at which the image shows the maximum contrast value among a plurality of the images while focus lens 111 is travelling from the nearest end to the infinity end, see (B) of FIG. 6. Then, the controller records the thus-determined position of focus lens 111 in focus information table 60, see row "c" shown in (B) of FIG. 7. In cases where, in an AF area, the contrast values of all the images are lower than a predetermined threshold value, it is determined that the AF area has no obvious focus position. Then, a predetermined value, which is intended to indicate an unknown focus position, is recorded in focus information table 60.

Moreover, after all the AF areas have been searched, controller 180 further records the following information in focus information table 60, see row "a" shown in (A) of FIG. 7. The recorded information includes: the nearest focus position (Pnear) closest to the nearest end, and the farthest focus position (Pfar) closest to the infinity end, with both the positions being chosen from among the focus positions that are determined while focus lens 111 is travelling from the nearest end to the infinity end. This completes the focus searching operation. Note that, at this point of operation, information on the frame numbers, to be shown in row "b" in (B) of FIG. 7, has yet to be contained in focus information table 60.

Returning to FIG. 8, the process continues as follows: After the focus searching has been completed, controller 180 determines whether or not release button 211 still remains in the half-depressed state made by the user (S13).

After the focus searching has been completed, when it is determined that release button 211 is no longer in the half-depressed state made by the user (NO in S13), controller 180 returns the process to Step S11. With this operation, it becomes possible for the user to redo the focus searching.

When it is determined that release button 211 still remains in the half-depressed state made by the user even after the focus searching has been completed (YES in S13), then controller 180 determines whether or not release button 211 is full-depressed by the user (S14).

Figure 9:
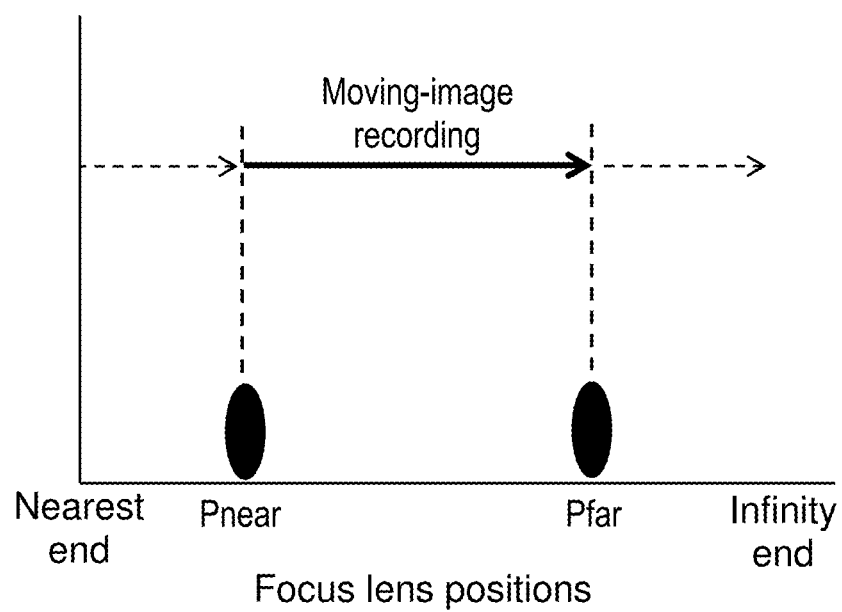
FIG. 9 is a view illustrating a travel range of the focus lens when the multi-focus moving image is recorded.

After that, when release button 211 is full-depressed by the user (YES in S14), an image shooting operation for recording a multi-focus moving image is started (S15). That is, controller 180 causes focus lens 111 to return to the nearest focus-lens position (Pnear), and then records a moving image (multi-focus moving image) while the focus lens is travelling to the farthest focus-lens position (Pfar), as shown in FIG. 9 (S15). The travel range of focus lens 111 when the moving image is recorded is restricted within such a range (from Pnear to Pfar), thereby preventing the recording of the moving-image in a range in which focus cannot be obtained. This can shorten the time required for recording the moving image. Note that the moving image is recorded in a predetermined format for moving image data. For example, the moving image is recorded in conformity with the MP4 standard (H.264/MPEG-4 AVC standard). While recording the moving image, display monitor 220 may display an icon, a message, or the like, for example, which indicates that the apparatus is currently recording the moving image.

Moreover, while recording the moving image, controller 180 associates the current position of focus lens 111 with the frame number of the corresponding frame among the frames that configure the moving image being currently recorded. With this operation, in focus information table 60, each of the AF areas is associated with the corresponding frame number, see row "b" shown in (B) of FIG. 7.

While recording the moving image, display monitor 220 displays the image being currently recorded. In addition, the display of an in-focus area in the image may be highlighted, thereby allowing the user to recognize the in-focus area. Displaying such a highlighted area makes it possible for the user to easily grasp the area being in focus in the image.

Returning to FIG. 8, the process continues as follows: When the moving-image recording is completed (S15), the moving image data are recorded in memory card 200, with the moving image data containing focus information table 60 that is stored in a header part of the data (S16). This operation completes the recording process (S1 shown in FIG. 3) of the moving-image (multi-focus moving image).

After the moving-image recording process (S1) has been completed, focus stacking processing (S2) is performed, in accordance with instructions by the user.

2-1-2. Focus Stacking Processing

Figure 10:
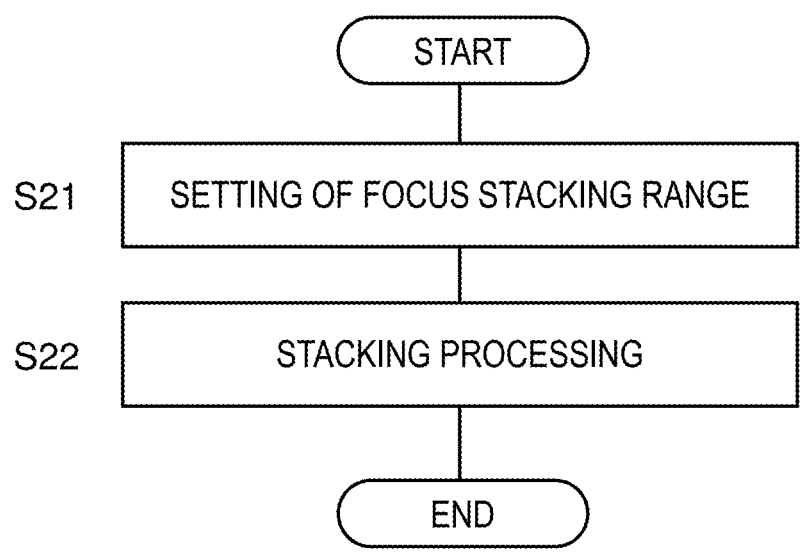
FIG. 10 is a flowchart illustrating the focus stacking processing.

Hereinafter, focus stacking processing (S2) will be described. FIG. 10 is a flowchart illustrating the focus stacking processing. In the focus stacking processing, controller 180 starts by setting a focus stacking range in accordance with the instructions by the user (S21), and then performs the stacking processing on the basis of the thus-set range (S22). Hereinafter, each of the processes (S21 and S22) will be described.

2-1-2-1. Setting of Focus Stacking Range

First, a user's operation for designating a focus stacking range is described.

Figure 11A:
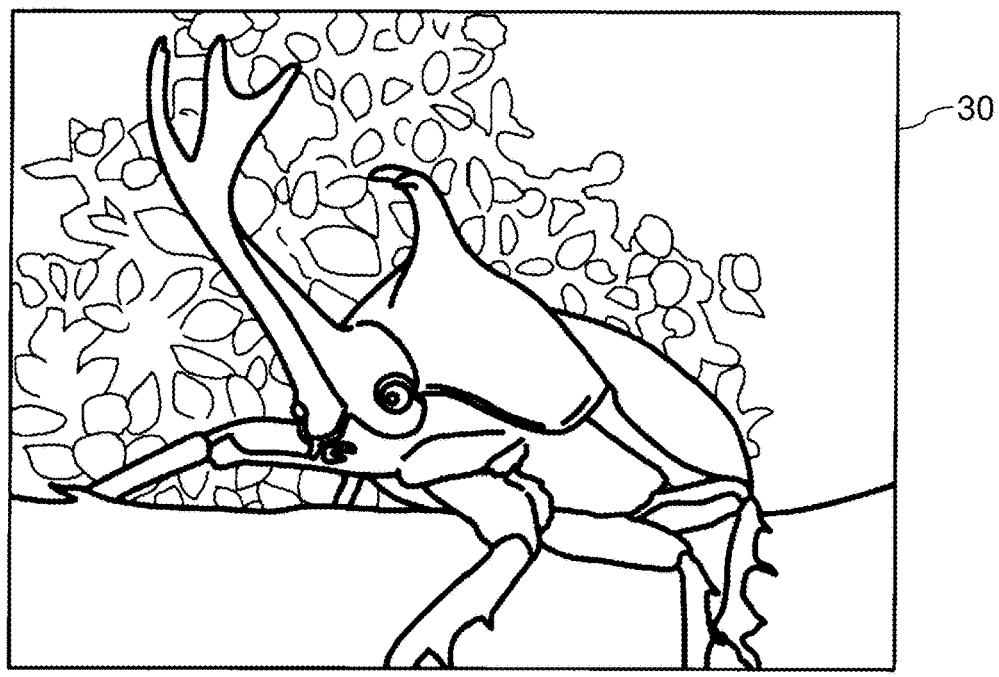
FIG. 11A is a view illustrating an example of a preview image.
Figure 11B:
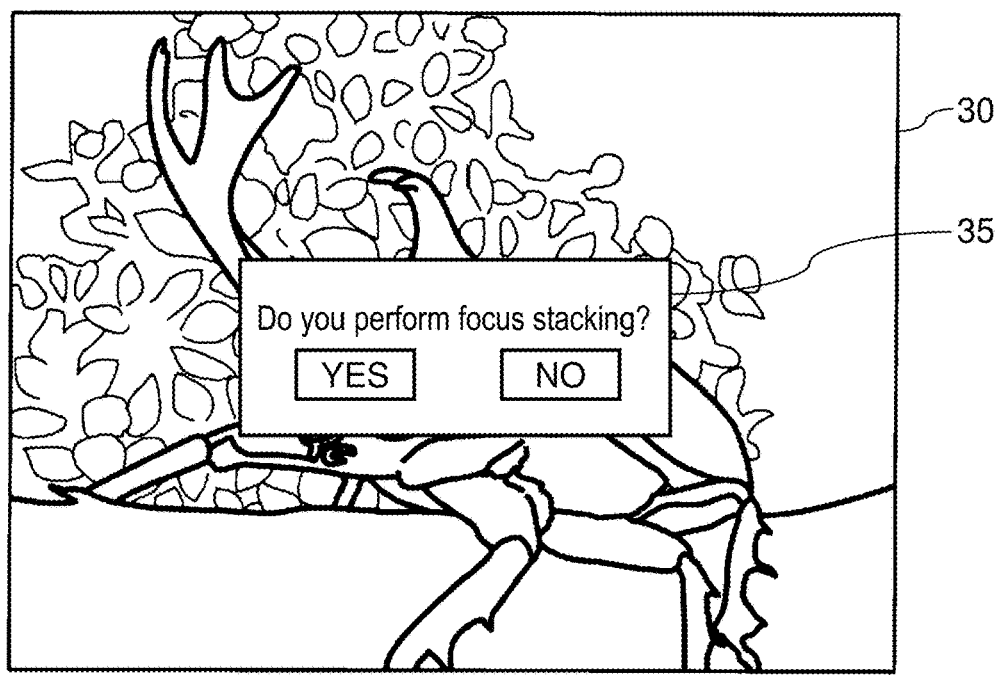
FIG. 11B is a view illustrating an example of a screen for asking a user about whether to perform focus stacking.

Immediately after the multi-focus moving image has been recorded, preview image 30 (still image) for checking to see the recorded image is displayed on display monitor 220, as shown in FIG. 11A. Preview image 30 is an image among a plurality of the frame images that configure the recorded multi-focus moving image. In a state of preview image 30 being displayed, when the user performs a predetermined operation (e.g. a touching operation onto a touch panel, a pressing operation on a designated button, etc.), dialog box 35 appears on preview image 30, as shown in FIG. 11B, for asking the user about whether to perform focus stacking. Note that, in cases where a playback screen is displayed for selecting and playing back an image from among the recorded images, dialog box 35 may also be displayed on the screen when the user performs a predetermined operation while a still image (one frame image) is being displayed which typically represents the multi-focus moving image.

When "YES" is chosen in dialog box 35, controller 180 causes display monitor 220 to display a range designation screen which is to be used for the user to designate an area (region) of an object that the user wants to bring into focus.

Figure 12A:
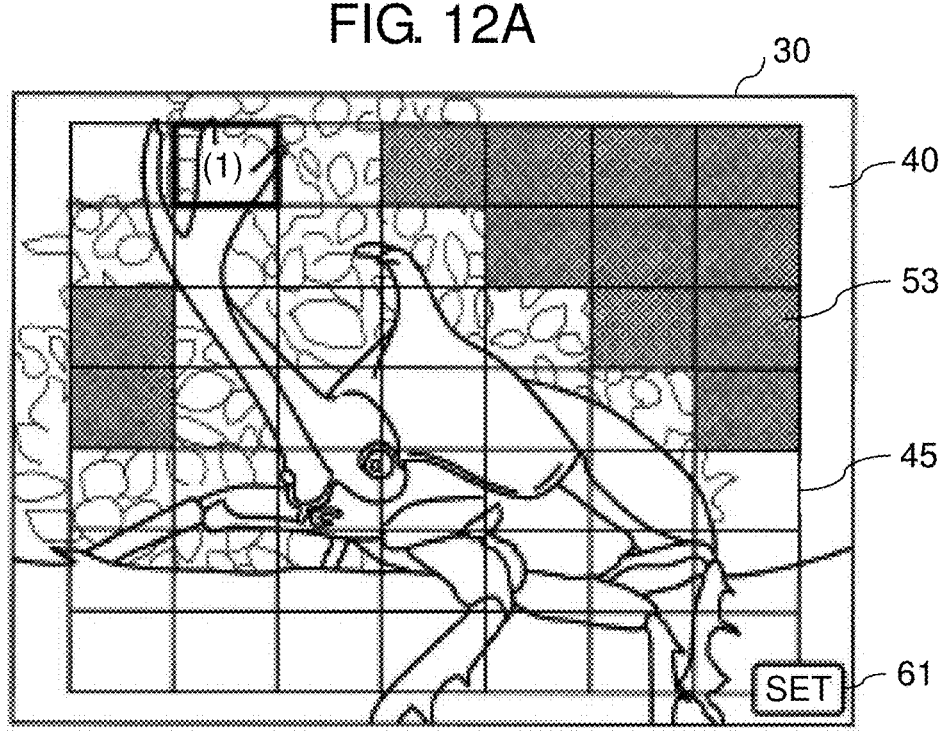
FIG. 12A is a view illustrating an example of an range designation screen for use in designating a focus stacking range.

FIG. 12A is a view illustrating an example of the range designation screen. In range designation screen 40, there are displayed images including: preview image 30, i.e. one frame image (an image of the object) of the frame images that configure the multi-focus moving image; and area frame 45 that indicates a plurality of image areas (referred to only as "areas," herein after), with the area frame being superimposed on the preview image. Area frame 45 defines 49 areas (7 rows by 7 columns). Each of the areas indicated by area frame 45 is associated with the corresponding one of the AF areas shown in (A) of FIG. 6. The user can designate a range (a focus stacking range, in other words), which the user wants to bring into focus, of the object. This designation is made by designating two areas (i.e. a starting and an end point of the stacking range) by touching operation onto range designation screen 40. Note that area frame 45 may be displayed not necessarily on display monitor 220.

Figure 12B:
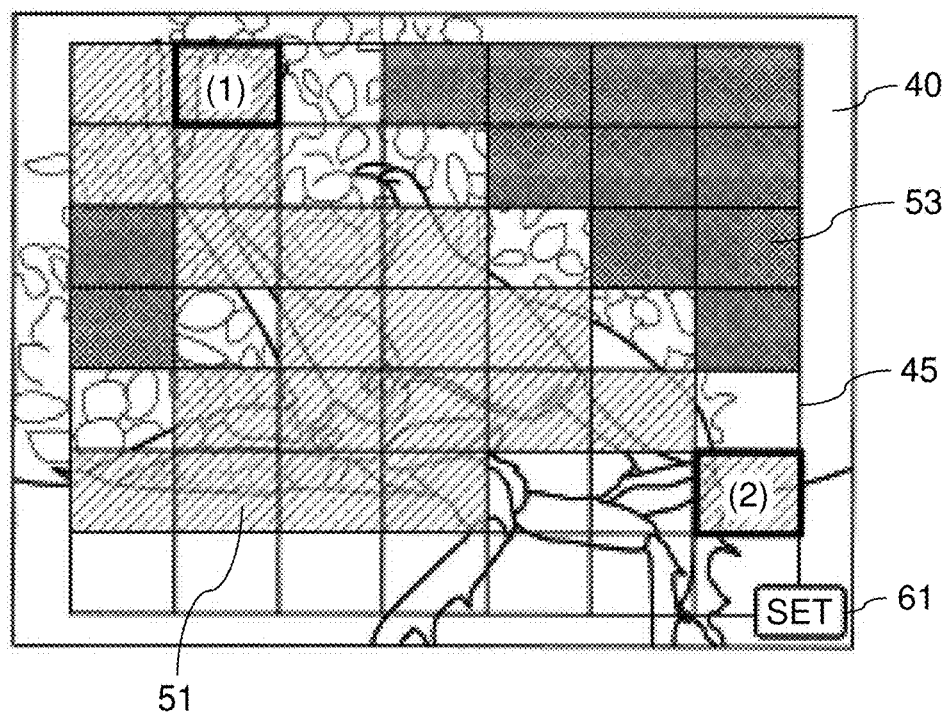
FIG. 12B is a view illustrating an example of the range designation screen for use in designating the focus stacking range.

Range designation screen 40 shown in FIG. 12A shows a shot image of a Japanese rhinoceros beetle. In the screen, area (1) containing a tip of a beetle's horn is designated as a starting point of the area which the user wants to bring into focus (i.e. the focus stacking range); area (1) is associated with the second AF area shown in (A) of FIG. 6. After that, as shown in FIG. 12B, area (2) containing a beetle's left hind leg is designated by the user as an end point of the area (i.e. the focus stacking range) to be brought into focus; area (2) is associated with the 42th AF area shown in (A) of FIG. 6. In this way, upon designation of two areas (1) and (2) by the user, controller 180 sets the focus stacking range on the basis of thus-designated two areas (1) and (2).

Specifically, controller 180 sets the following frame images as the focus stacking range, see (B) of FIG. 13. The frame images include: frame images associated with areas (1) and (2) (i.e. the second AF area and the 42th AF area); and a group of frame images associated with AF areas each of which has a focus position between the focus position of areas (1) and the focus position of areas (2). Note that, in cases where an area is designated by the user, information indicating the designated area is stored in buffer 170 where the information is managed as a user-designated area.

In range designation screen 40, when the two areas are designated by the user, the areas which correspond to the focus stacking range are subjected to display-highlighting 51. For example, in range designation screen 40 shown in FIG. 12B, the following areas are subjected to display-highlighting 51 which indicates the focus stacking range (i.e. the area which the user wants to bring into focus). Such areas include: designated area (1); designated area (2); and a group of areas each of which has a focus position between the focus position of area (1) and the focus position of area (2). Through display-highlighting 51 in this way, the user can easily recognize the range (focus stacking range) which the user has designated as the range to be brought into focus.

In addition, in range designation screen 40 as shown in FIGS. 12A and 12B, areas which are determined to be inappropriate for use in the focus stacking are subjected to display-highlighting 53 that indicates a warning (each of such areas is referred to as a "warning area," hereinafter), see (A) and (B) of FIG. 13. The warning area is set on the basis of the areas that have been designated by the user (details will be described later). Such display-highlighting 53 allows the user to recognize that these areas are inappropriate for use in the designated range (focus stacking range) which the user wants to bring into focus.

Now, descriptions will be made regarding operations in cases where, in the state the two areas have been designated by the user as shown in FIG. 12B, a third area is additionally designated by the user.

In the example shown in FIG. 12B, the focus stacking range designated by the user does not contain a beetle's left front leg. In such a situation, when the user wants to cause the focus stacking range to contain the beetle's left front leg, the user can perform an additional touch operation onto area (3) that contains the beetle's left front leg, thereby changing the focus stacking range (see FIG. 12C). When area (3) is additionally specified, an in-focus range (focus stacking range) is newly set which ranges from area (3) to area (2), from among all the areas (1) to (3) designated by the user, see (C) of FIG. 13. Area (3) contains an object located closest to the nearest end, and area (2) contains an object located closest to the infinity end. Following the resetting of the in-focus area (focus stacking range), the areas as well to be subjected to display-highlighting 51 are changed (see FIG. 12C).

Figure 12C:
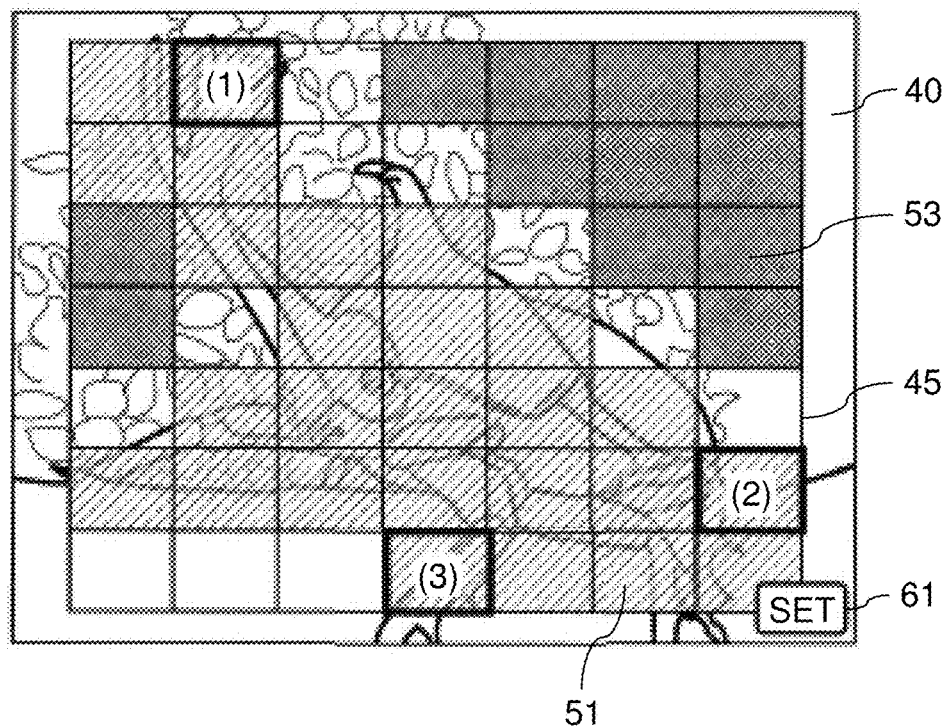
FIG. 12C is a view illustrating an example of the range designation screen for use in designating the focus stacking range.
Figure 12D:
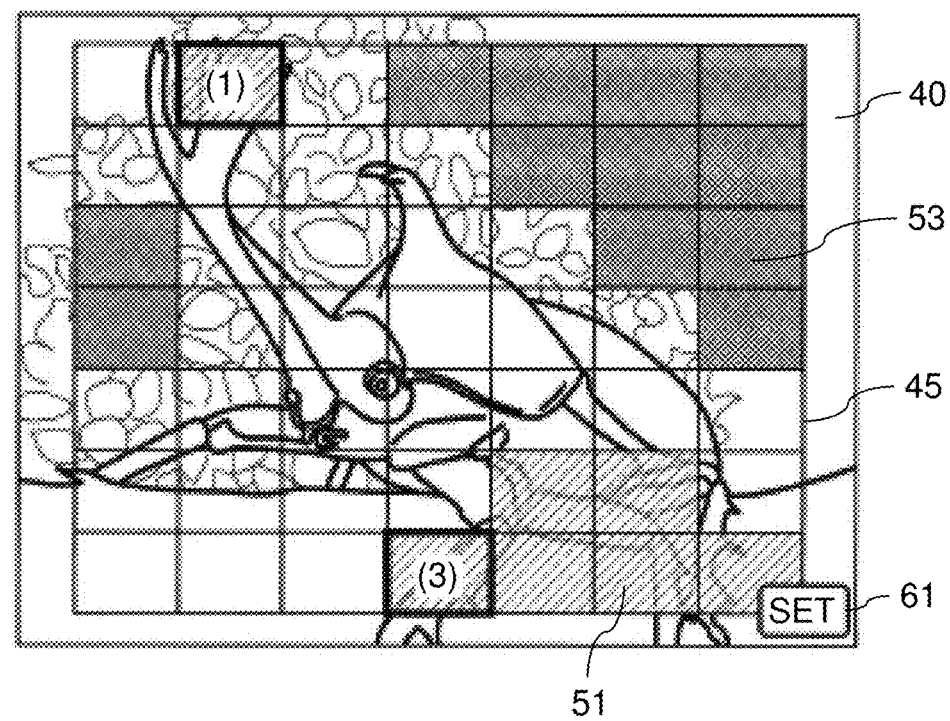
FIG. 12D is a view illustrating an example of the range designation screen for use in designating the focus stacking range.
Figure 13A:
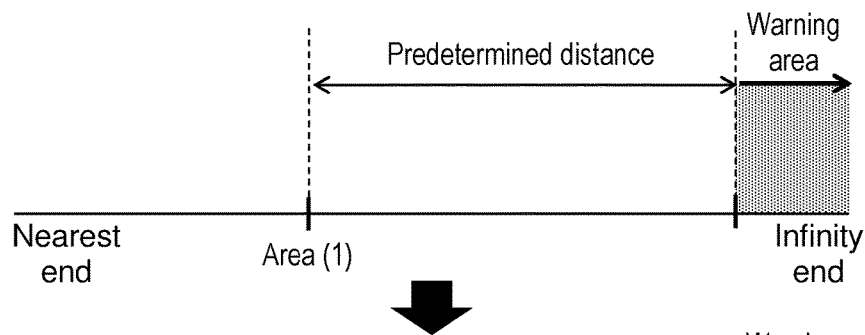
FIG. 13A is a view illustrating changes of the focus stacking range, the setting of which is changed in accordance with areas designated by the user.
Figure 13B:
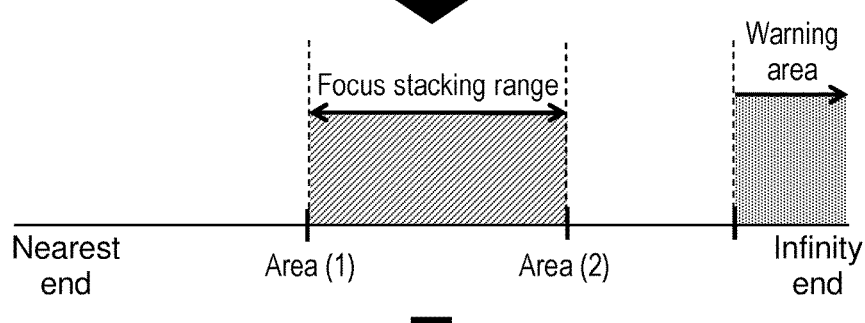
FIG. 13B is a view illustrating changes of the focus stacking range, the setting of which is changed in accordance with areas designated by the user.
Figure 13C:
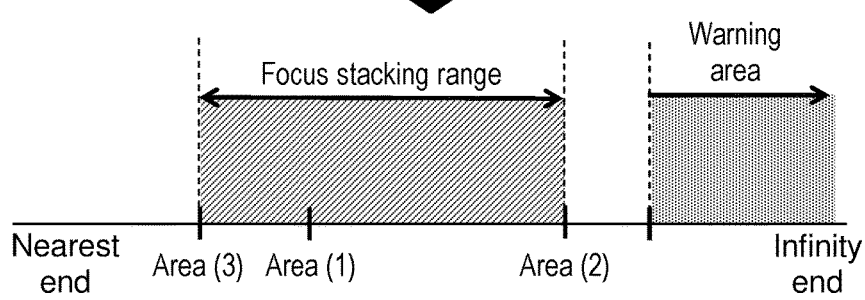
FIG. 13C is a view illustrating changes of the focus stacking range, the setting of which is changed in accordance with areas designated by the user.
Figure 13D:
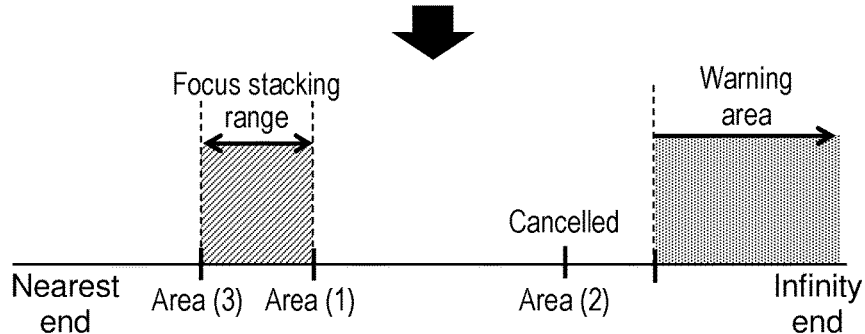
FIG. 13D is a view illustrating changes of the focus stacking range, the setting of which is changed in accordance with areas designated by the user.

Moreover, in the state shown in FIG. 12C, when area (2) is re-designated by a user's touch operation, area (2) is deleted from the group of the areas designated by the user, followed by resetting the focus stacking range on the basis of area (1) and area (3), see (D) of FIG. 13. That is, the focus stacking range is reset such that an image can be obtained which contains in-focus areas ranging from the tip of the beetle's horn to the beetle's left front leg. Following the resetting of the focus stacking range, display-highlighting 51 is changed as shown in FIG. 12D. In this way, by touching again the once-designated area, the designation of the area can be cancelled.

Figure 14:
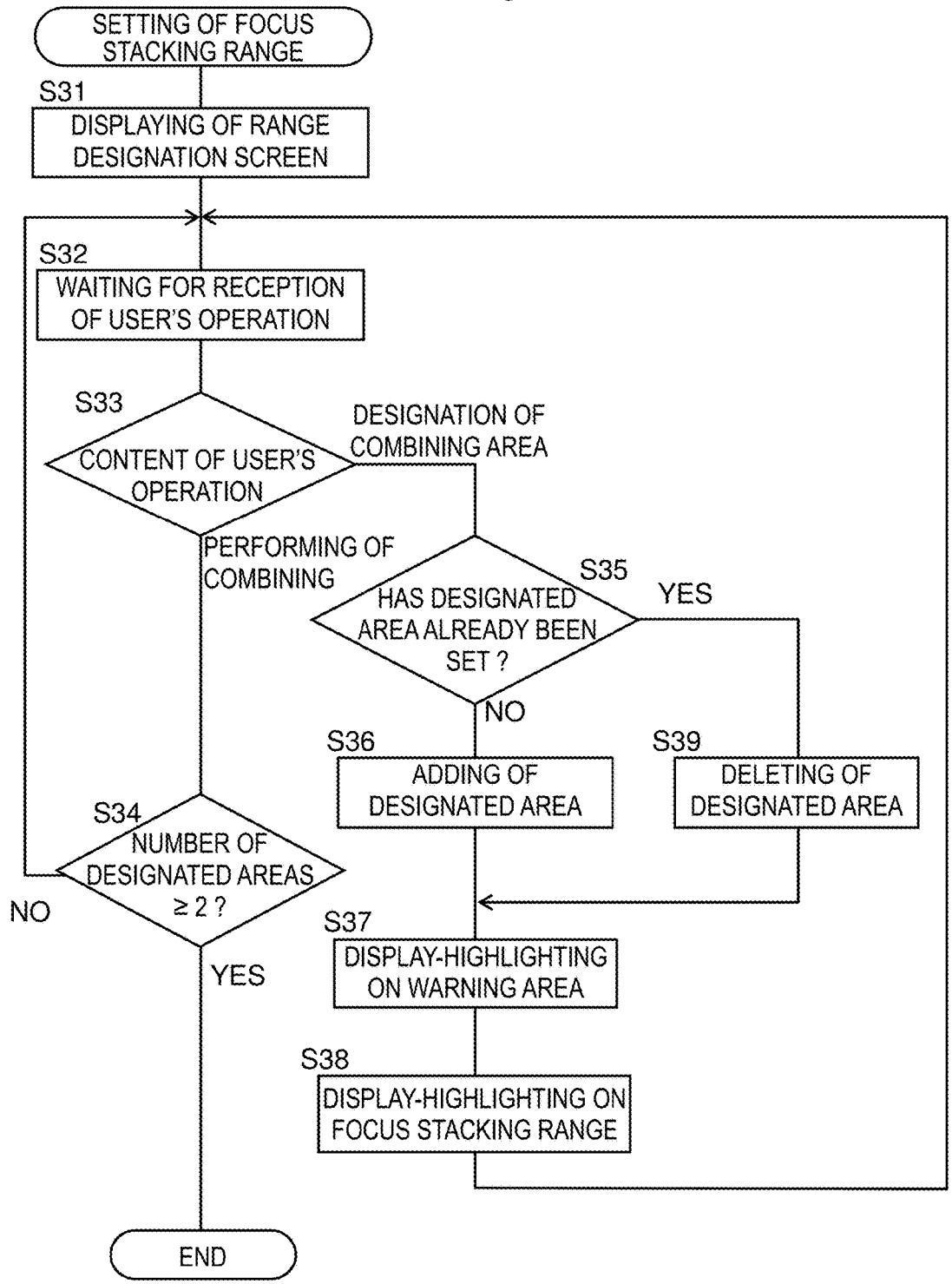
FIG. 14 is a flowchart illustrating setting processing of the focus stacking range.

FIG. 14 is a flowchart illustrating setting processing (S21) of the focus stacking range. The setting processing of the focus stacking range performed by controller 180 will be described, with reference to the flowchart shown in FIG. 14.

As shown in FIG. 12A, controller 180 displays, on display monitor 220, range designation screen 40 to be used for designating an object's area (region) which the user wants to bring into focus (S31). Range designation screen 40 displays an image of a plurality of the frame images which configure a multi-focus moving image that has been recorded in advance. For example, in range designation screen 40, of the frame images contained in the multi-focus moving image, there is displayed the frame image recorded at the beginning, the frame image recorded at the last, or a frame image recorded at a time between them.

Next, controller 180 waits for a user's operation (S32). In range designation screen 40, upon receiving user's designation of a stacking area (designation of the stacking area in S33), controller 180 determines whether or not the newly-designated area is one that has already been set (S35). When it is determined that the newly-designated area has already been designated (YES in S35), controller 180 deletes the designated area from the areas which are currently managed as user-designated areas by the controller (S39). For example, in the case shown in FIG. 12C, controller 180 is currently managing areas (1), (2), and (3), as the user-designated areas. In this state, when area (2) is re-designated, the controller deletes area (2) from the areas which are currently managed as the user-designated areas. On the other hand, when the newly-designated area is determined to have yet to be designated (NO in S35), the controller adds the newly-designated area to the areas which are currently managed as the user-designated areas (S36).

After that, the controller sets a warning area (an area which is determined to be inappropriate for use in the focus stacking) based on the areas which are managed as the user-designated areas, and then causes the thus-set warning area to be subjected to display-highlighting 53 which indicates that the area is a warning area (S37).

Moreover, the controller sets a focus stacking range based on the areas which are managed as the user-designated areas, and then performs display-highlighting 51 on the areas corresponding to the thus-set focus stacking range (S38).

On the other hand, when it is determined that the thus-received user's operation is intended to give instructions to perform stacking processing (performing the stacking processing in S33), controller 180 determines whether or not the number of the designated areas is not smaller than 2 (two) (S34). Incidentally, the above determination that the user's operation is intended to give the instructions to perform the stacking processing is made when either of the following user's operations is performed. Such operations are a touching operation to "SET" button 61 appearing on range designation screen 40 and a depressing operation to decision button 214 disposed on the rear of the digital camera. When the number of the designated areas is smaller than two (NO in S34), controller 180 returns the process to Step S32, and waits for the next user's area-designation operation. On the other hand, when the number of the designated areas is not smaller than two (YES in S34), the controller ends the processing.

Next, display-highlighting processing (S37) of a warning area will be described in detail. As described above, when at least one area is designated by the user, an area is subjected to display-highlighting 53. Such a thus-highlighted area is considered, based on the thus-designated at least one area, to be inappropriate as an area which will be designated next to be included in a focus stacking range. This display-highlighting can notify the user that the area (warning area) is inappropriate as the area which will be designated next to be included in the focus stacking range.

Figure 15:
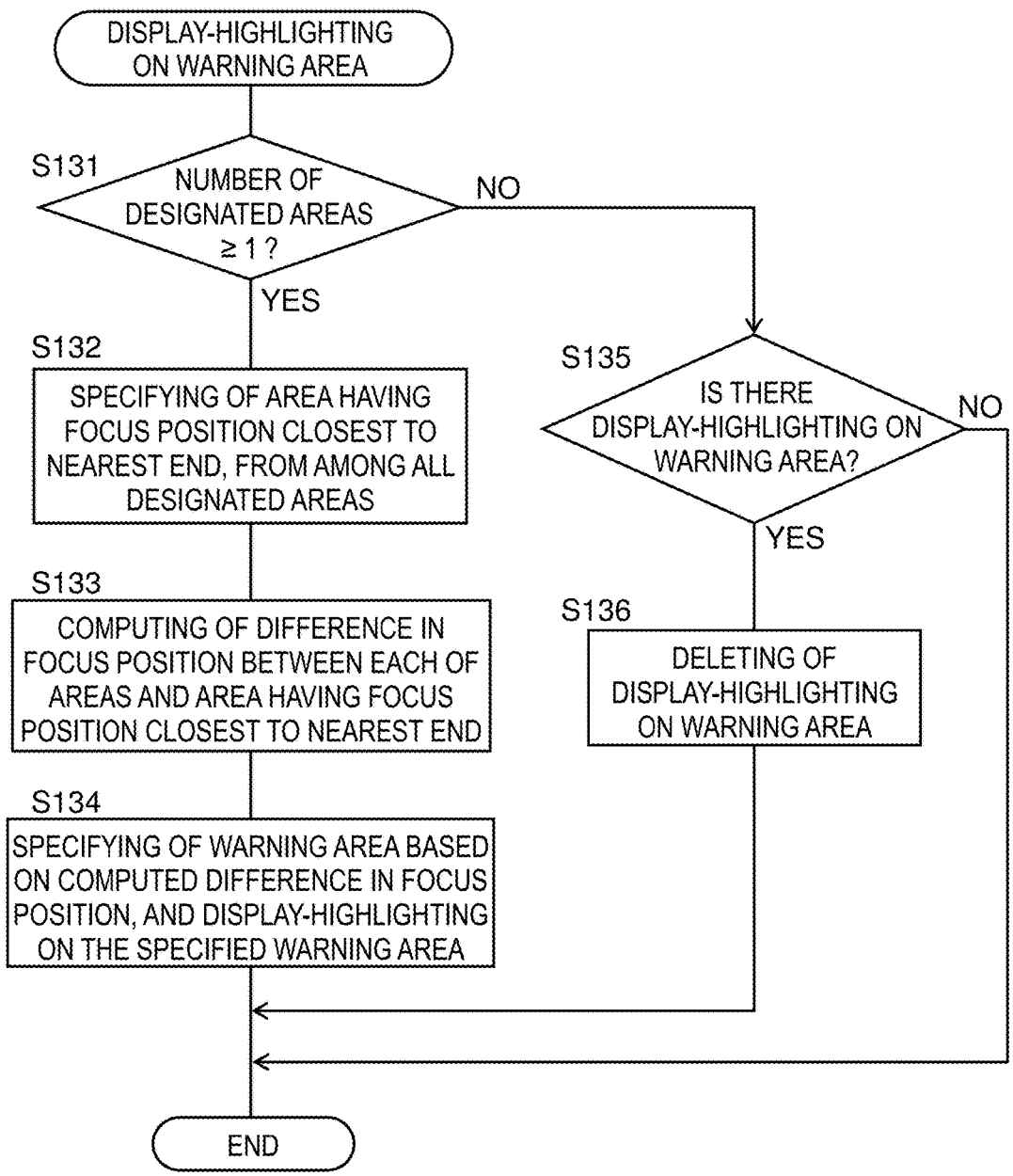
FIG. 15 is a flowchart illustrating display-highlighting processing on a warning area.

FIG. 15 is a flowchart illustrating the display-highlighting processing (S37) of a warning area. In FIG. 15, controller 180 determines whether or not the number of the areas designated by the user in range designation screen 40 is not smaller than 1 (one) (S131). When the number of the designated areas is not smaller than 1 (one) (YES in S131), controller 180 specifies the area that has the focus position closest to the nearest end, from among all the designated areas (S132). By referring to focus information table 60, i.e. (B) of FIG. 7, controller 180 can specify the area that has the focus position (i.e. the focus lens position of the area being in focus) closest to the nearest end, from among all the designated areas.

Controller 180 computes a difference in focus position (in other words, a difference in focus distance) between each of other areas and the area that has the focus position closest to the nearest end (S133). Controller 180 determines an area, the computed difference of which is not smaller than a predetermined value, and specifies the area as a warning area. Then, the controller performs display-highlighting 53 on the thus-specified warning area (S134). In this way, of the designated areas, an area is set as a warning area when the thus-set area has a focus position (focus lens position) located not smaller than the predetermined value away from the focus position of the area that has the focus position closest to the nearest end. Note that, the warning area is set based on the distance of its focus position from the focus position of the area which has the focus position closest to the nearest end. Instead, however, the warning area may be set based on the distance of its focus position from the focus position of the area which has the focus position closest to the infinity end. This is because it is difficult to obtain a combined image with favorable image quality in cases where differences in focus position are too large among the images that are used in the focus stacking. Moreover, a warning area that is set based on the distance from the focus position of the area which has the focus position closest to the nearest end, may be displayed simultaneously with a warning area that is set based on the distance from the focus position of the area which has the focus position closest to the infinity end.

On the other hand, when the number of the designated areas is smaller than 1 (one) (NO in S131), that is, when no area is designated, controller 180 determines whether or not there is a warning area subjected to display-highlighting 53 in range designation screen 40 (S135). When there is a warning area subjected to display-highlighting 53 (YES in S135), controller 180 deletes display-highlighting 53 from the warning area (S136).

In this way, the warning area is specified and subjected to display-highlighting 53. This display-highlighting enables the user to recognize the warning area.

Next, display-highlighting processing (S38 in FIG. 14) of the focus stacking range will be described in detail. FIG. 16 is a flowchart illustrating the display-highlighting processing on the focus stacking range.

In FIG. 16, in range designation screen 40, controller 180 determines whether or not the number of the areas designated by the user is not smaller than 2 (two) (S141).

When the number of the designated areas is not smaller than 2 (two) (YES in S141), controller 180 specifies the following areas from among all the designated areas (S142). The areas are the area (referred to as the "starting-point area," hereinafter) that has the focus position located closest to the nearest end, and the area (referred to as the "end-point area," hereinafter) that has the focus position located farthest from the nearest end. Controller 180 can specify the starting-point area and the end-point area by specifying the following AF areas from among all the designated areas, referring to focus information table 60, i.e. (B) of FIG. 7. Such AF areas are respectively the AF area that has the focus position (i.e. the focus lens position of the area being in focus) closest to the nearest end, and the AF area that has the focus position farthest from the nearest end. Instead, however, the configuration may be such that the "starting-point area" is the area that has the focus position farthest from the nearest end, and that the "end-point area" is the area that has the focus position closest to the nearest end.

Next, controller 180 specifies a group of AF areas, each of which has the focus position between the focus position of the starting-point area and the focus position of the end-point area (S143). By referring to focus information table 60, i.e. (B) of FIG. 7, controller 180 can specify the group of the AF areas each of which has the focus position between the focus position of the starting-point area and the focus position of the end-point area.

Controller 180 performs display-highlighting 51 on the following areas in range designation screen 40, with the display-highlighting indicating that these areas are in the focus stacking range (S144). These areas are all the designated areas and the areas associated with the AF areas specified in Step S143.

On the other hand, in Step S141, when the number of the designated areas is smaller than 2 (two) (NO in S141), controller 180 determines whether or not display-highlighting has been performed to indicate a focus stacking range in range designation screen 40 (S145). In a case where display-highlighting 51 has been performed to indicate the focus stacking range (YES in S145), controller 180 deletes display-highlighting 51 that indicates the focus stacking range (S146).

In this way, the focus stacking range is specified on the basis of the user's designation, and then the focus stacking range is subjected to display-highlighting 51. By referring to the screen having been subjected to display-highlighting 51, the user can easily check to see the object's areas to be combined by the focus stacking processing. Note that, under the control described above, display-highlighting 53 on warning areas is intended merely to warn the user of inappropriate areas. Therefore, if the warning areas are contained in the range that is designated by the user, the focus stacking range is set including such warning areas as well. In cases, however, where the range designated by the user contains the warning areas, the focus stacking range may be set excluding the warning areas.

2-1-2-2. Stacking Processing

Stacking processing (S22) of the flowchart shown in FIG. 10 will be described.

Referring to focus information table 60, controller 180 specifies the frame number of the frame that has a focus position for each of the areas that have been specified as the focus stacking range in Step S144 (FIG. 16) described above. Then, controller 180 controls image processor 160 such that the processor performs focus stacking processing by using the frame images associated with the thus-specified frame numbers. Upon receiving the instructions from controller 180, image processor 160 performs the focus stacking processing.

3. Advantages and Others

Digital camera 100 according to the embodiment includes: CCD 140, image processor 160, display monitor 220, touch panel 222, and controller 180. The CCD captures images of an object, while their focus positions are being changed, to produce data of a plurality of images (a multi-focus moving image). The image processor combines the data of the plurality of the images produced by CCD 140, thereby generating data of a still image which is deeper in depth of field than the captured images. The display monitor displays range designation screen 40 which is used for a user to designate a focusing range desired by the user; the range designation screen shows a plurality of image areas as well as images produced by image data. The touch panel receives user's designation of image areas in range designation screen 40. The controller controls image processor 160 and controller 180. When the user designates a first and a second image area in range designation screen 40, controller 180 specifies other image areas each of which has a focus position between the focus position of an object in the first image area and the focus position of an object in the second image area (S143). Then, the controller sets a combining range that includes: the first image area, the second image area, and the thus-specified other image areas (S144). Display monitor 220 performs display-highlighting 51 on the areas which are set as the combining range in range designation screen 40 (see FIGS. 12B to 12D).

As described above, in accordance with digital camera 100, when two image areas are designated by the user, image areas to be combined via the focus stacking, i.e. an object's range to be brought into focus, are subjected to the display-highlighting. This allows the user to easily recognize the object's range to be brought into focus. Moreover, the user can designate the in-focus range only by designating the starting and the end point of the object's range which the user wants to bring into focus. Therefore, this can enhance user's convenience in cases where the user sets an object's range which the user wants to bring into focus.

Moreover, digital camera 100 further includes focus information table 60 in which each of the image areas is associated with the focus position of an object contained in the image area. By referring to focus information table 60, the focus position of an object contained in each of the image areas can be recognized.

Moreover, when the user additionally designates a third image area in range designation screen 40, controller 180 specifies both a starting area that has the focus position closest to the nearest end and an end area that has the focus position farthest from the nearest end, from among the focus positions of image areas ranging from the first area to the third area (S142 in FIG. 16). Next, controller 180 specifies other image areas each of which has a focus position between the focus position of an object in the starting area and the focus position of an object in the end area (S143). Then, the controller resets the combining range such that it contains the starting area, the end area, and the thus-specified other image areas (S144). At this time, display monitor 220 performs the display-highlighting on the image areas which have been reset as the combining range, in range designation screen 40 (S144). In this way, even in the state where the combining range has been set, the user can change the combining range by additionally designating another image area (a third image area).

Furthermore, after the third image area has been designated, when the user re-designates any one of the first to third image areas, controller 180 resets the combining range on the basis of two image areas that consist of the first to third image areas except the re-designated image area. In this way, when the image area having already been designated is re-designated, the previous designation of the image area is cancelled.

Moreover, in cases where the user designates at least one image area, controller 180 specifies a range of warning areas (i.e. image areas which are inappropriate as image areas to be designated next) on the basis of the designated area (S134 in FIG. 15). Display monitor 220 performs display-highlighting 53 on the range of the warning areas in range designation screen 40. The display-highlighting allows the user to recognize areas that would possibly produce a combined image with poor quality as a result of focus stacking. Based on the recognition, the user can avoid selecting such areas, in advance, so that they will not be used for the focus stacking.

Other Exemplary Embodiments

As described above, the first embodiment has been described to exemplify the technology disclosed in the present application. However, the technology is not limited to the embodiment, and is also applicable to embodiments that are subjected, as appropriate, to various changes and modifications, replacements, additions, omissions, and the like. Moreover, the technology disclosed herein also allows another embodiment which is configured by combining the appropriate constituent elements in the first embodiment described above. Hence, other embodiments will be exemplified hereinafter.

The mode of the display-highlighting described in the embodiment mentioned above is not limited to those shown in FIGS. 12A to 12D. The display-highlighting may be performed by other methods (e.g. highlighting by enhancing a display-frame, edges of an object, etc.) as long as they can provide a mode that allows the user to visually recognize a focus stacking range, a warning area, etc.

In the embodiment described above, the combining range is designated via at least two times of the user's touching operation onto touch panel 222. However, the operation of designating the combining range is not limited to the touching operation; therefore, the operation may be one of other gestural operations. For example, a pinch-in and a pinch-out operation may be used. Moreover, the touching operation may be a non-contact gestural operation to touch panel 222.

In the embodiment described above, the focus stacking processing is performed by image processor 160 of digital camera 100, serving as an imaging apparatus, through use of the frame images that have been produced by CCD 140 serving as an imaging unit. However, the focus stacking processing may be performed not in the inside of digital camera 100. For example, the image data of frame images produced by the imaging unit of the imaging apparatus may be transmitted to a server or a personal computer (PC) which is provided with an image processor, and then the image processor performs the focus stacking processing of the image data. In this case, the server or PC functions as the image processor.

In the embodiment described above, the focus stacking is performed through use of the frame images that configure a multi-focus moving image. However, the focus stacking may be performed through use of a plurality of still images which have been produced by continuous shooting, instead of the frame images that configure a multi-focus moving image.

The idea disclosed by describing the above embodiment is applicable to two types of digital cameras, that is, interchangeable lens cameras and integrated lens cameras.

In the embodiment described above, the descriptions have been made by using the case of the digital camera, as an example of the imaging apparatus; however, the imaging apparatus is not limited to the case. The idea according to the present disclosure is applicable to a wide range of imaging apparatuses capable of shooting moving images, with the apparatuses including digital video cameras, smartphones, and wearable cameras.

In the embodiment described above, the imaging element is configured with a CCD; however, the imaging element is not limited to this. The imaging element may be configured with, such as, an N-channel metal oxide semiconductor (NMOS) image sensor or a complementary metal oxide semiconductor (CMOS) image sensor.

As described above, the exemplary embodiments have been described to exemplify the technology according to the present disclosure. To that end, the accompanying drawings and the detailed descriptions have been provided. Therefore, the constituent elements described in the accompanying drawings and the detailed descriptions may include not only essential elements for solving problems, but also inessential ones for solving the problems which are described only for the exemplification of the technology described above. For this reason, it should not be acknowledged that these inessential elements are considered to be essential only on the grounds that these inessential elements are described in the accompanying drawings and/or the detailed descriptions. Moreover, because the aforementioned embodiments are used only for the exemplification of the technology disclosed herein, it is to be understood that various changes and modifications, replacements, additions, omissions, and the like may be made to the embodiments without departing from the scope of the appended claims or the scope of their equivalents.

INDUSTRIAL APPLICABILITY

The technology according to the present disclosure is applicable to imaging apparatuses capable of shooting moving images. Specifically, the technology is applicable to a wide range of imaging apparatuses capable of shooting moving images, with the apparatuses including digital cameras, digital video cameras, smartphones, and wearable cameras.

What is claimed is:
1. An image processing apparatus, comprising:
an image processor configured to combine data of a plurality of images to generate a still image having a deeper depth of field, wherein the plurality of images were generated by shooting an object image while changing a focus position, such that each of the plurality of images is of the object image and the focus position varies between the plurality of images;
a display unit configured to display a range designation screen displaying an image represented by the data of the images having a plurality of image areas;
an operation unit configured to receive from the user a designation of an image area in the range designation screen; and
a controller configured to control the image processor and the display unit, wherein:
when a first and a second image area in the range designation screen are designated by the user, the controller sets the first image area and the second image area as a starting-point area and an end-point area, respectively;

the starting-point area is in focus in a particular image of the plurality of images;

the end-point area is in focus in another image of the plurality of images;

the controller specifies another image area;

the another image area is in focus in an in-between image;

the in-between image has a focus position located between a focus position of the particular image and a focus position of the another image;

the controller sets a combining range including the starting-point area, the end-point area, and the specified another image area; and the display unit performs a first display-highlighting, on the image displayed by the range designation screen, of the image areas included in the combining range;

the image processor synthesizes the still image having a deeper depth of field by combining the data of the images, wherein each of the images has the focus position in one of the starting-point area, the end-point area, and the another image area.

2. The image processing apparatus according to claim 1, wherein each of the image areas is associated with a focus position of an object in the image area.

3. The image processing apparatus according to claim 1, wherein when a third image area is further designated in the range designation screen by the user, a closest and a farthest focus positions are specified from among focus positions associated with the first, second, and third image areas, the closest focus position being closest to a nearest end, the farthest focus position being farthest from the nearest end;

the controller sets, as another starting-point area, an image area associated with the closest focus position and sets, as another end-point area, an image area associated with the farthest focus position;

the controller specifies still-another image area having a focus position located between a focus position of an object in the another starting-point area and a focus position of an object in the another end-point area;

the controller resets the combining range such that the combining range includes the another starting-point area, the another end-point area, and the specified still-another image area; and the display unit performs the first display-highlighting on the image displayed by the range designation screen, of the image areas included in the reset combining range.

4. The image processing apparatus according to claim 3, wherein, after the third image area has been designated, when any one of the first, second, and third image areas is re-designated by the user, the controller sets two image areas as still-another starting-point area and still-another end-point area, respectively, the two image areas being configured with the first, second, and third image areas, except for the any one image area re-designated;

the controller further resets the reset combining range by using the two image areas; and the display unit performs the first display-highlighting on the image areas included in the further-reset combining range in the range designation screen.

5. The image processing apparatus according to claim 1, wherein when at least one image area is designated by the user, the controller specifies a range of an inappropriate image area, based on the designated at least one image area, the inappropriate image area being inappropriate as an image area to be designated next; and the display unit performs a second display-highlighting on the specified range of the inappropriate image area in the range designation screen.

6. The image processing apparatus according to claim 5, wherein a closest focus position associated with one of the at least one image area designated by the user is specified, the closest focus position being located closest to either a nearest end or an infinity end; and the controller sets, as the inappropriate image area, an image area associated with a focus position located not smaller than a predetermined value away from the closest focus position.

7. The image processing apparatus according to claim 5, wherein the second display-highlighting performed on the specified range of the inappropriate image area is different from the first display-highlighting performed on the combining range.

8. The image processing apparatus according to claim 1, wherein the operation unit is a touch panel for receiving either a touching operation or a gestural operation, the touching operation and the gestural operation each being performed by the user.

9. An imaging apparatus, comprising:
an imaging unit for capturing an object image, while changing a focus position, to generate data of a plurality of images; and the image processing apparatus according to claim 1, wherein the data, combined by the image processor, of the plurality of the images are the data, generated by the imaging unit, of the plurality of the images.

* * * * *